United States Patent [19]

Kocur

[11] Patent Number: 5,679,618
[45] Date of Patent: Oct. 21, 1997

[54] ANTIFOAMS FOR SOLID CROP PROTECTION AGENTS

[75] Inventor: Jean Kocur, Hofheim am Taunus, Germany

[73] Assignee: Hoechst Aktiengesellschaft, Frankfurt, Germany

[21] Appl. No.: 461,181

[22] Filed: Jun. 5, 1995

Related U.S. Application Data

[63] Continuation of Ser. No. 31,620, Mar. 15, 1993, abandoned, which is a continuation-in-part of Ser. No. 549,210, Jul. 6, 1990, Pat. No. 5,332,714.

[30] Foreign Application Priority Data

Mar. 17, 1992 [DE] Germany ............... 42 08 514.4

[51] Int. Cl.$^6$ .................. A01N 54/12; A01N 25/30; B01D 19/04; B01F 17/12
[52] U.S. Cl. .................. 504/116; 71/DIG. 1; 252/321; 252/353; 252/354; 252/355; 252/358; 252/363.5; 424/409; 504/103
[58] Field of Search ................ 252/321, 353, 252/354, 355, 358, 363.5; 71/64.03, 64.08, DIG. 1; 424/409; 504/103, 116

[56] References Cited

U.S. PATENT DOCUMENTS

| | | | |
|---|---|---|---|
| 3,231,508 | 1/1966 | Lew | 252/321 X |
| 3,912,654 | 10/1975 | Heid et al. | 252/321 |
| 3,986,979 | 10/1976 | Moorer et al. | 252/353 |
| 4,024,072 | 5/1977 | Shane et al. | 252/358 |
| 4,065,287 | 12/1977 | Roth | 71/64.08 X |
| 4,762,636 | 8/1988 | Balliello et al. | 252/353 X |
| 4,867,972 | 9/1989 | Girardeau et al. | 514/952 X |
| 4,954,316 | 9/1990 | Globus | 424/409 X |
| 5,169,560 | 12/1992 | Hart | 252/321 |
| 5,332,714 | 7/1994 | Albrecht et al. | 504/116 |
| 5,364,832 | 11/1994 | Röchling et al. | 71/DIG. 1 |

FOREIGN PATENT DOCUMENTS

| | | | |
|---|---|---|---|
| 2020660 | 1/1991 | Canada . | |
| 2 546 845 | 4/1977 | Germany . | |
| 22 33 941 | 3/1978 | Germany . | |
| 3324499 | 1/1985 | Germany | 71/64.08 |
| 40 21 336 | 1/1991 | Germany . | |
| 3 926 800 | 2/1991 | Germany . | |
| 90/6382 | 5/1991 | South Africa . | |

*Primary Examiner*—Richard D. Lovering
*Attorney, Agent, or Firm*—Curtis, Morris & Safford, P.C.

[57] ABSTRACT

The invention relates to solid active substance formulations which contain wetting agents in combination with a surfactant (antifoam) from the group comprising perfluoroalkylphosphinic acid/perfluoroalkylphosphonic acids or their salts. The invention also relates to the use of these formulations, in particular in the preparation of spray slurries.

18 Claims, No Drawings

ANTIFOAMS FOR SOLID CROP PROTECTION AGENTS

This application is a continuation of application Ser. No. 08/031,620, filed on Mar. 15, 1993, now abandoned, and application Ser. No. 08/031,620 is a continuation-in-part of application Ser. No. 549,210, filed Jul. 6, 1990, now U.S. Pat. No. 5,332,714.

The invention relates to the use of specific perfluoroalkylphosphinic acids and perfluoroalkylphosphonic acids as antifoams in solid crop protection agents.

Solid crop protection agents are currently usually supplied in the form of wettable powders and granules, in particular in the form of water-dispersible granules.

It is known that herbicidal, fungicidal or insecticidal active substances are used alongside inert fillers, such as chalk, kaolin or silica, in particular surface-active substances, in the preparation of these formulations so that the preparations are well wetted and dispersed in water when they are used. In the case of the water-dispersible granules, rapid disintegration should additionally take place after introduction into water.

In addition, it is known that the surface-active substances, in particular wetting agents, frequently contribute to intensification of the action, in particular of foliar-acting herbicides, and then are used in a particularly high proportion in the formulations (DE-A-2 926 800).

Wetting agents also lower the surface tension of the spray slurry. As a result, uniform wetting of the leaf surface and, associated with this, frequently a better absorption of the active substances are ensured. However, because of the low surface tension, these spray slurries also tend to foam. This can lead to overflow of the spray tank and to irregular spray coatings on the plants.

The use of an antifoam as additive, which is added separately to the spray slurry, can frequently provide a remedy. However, the use as additives requires the use of a further agent in addition to the crop protection agent and, optionally, an additional wetting agent and in practice is not readily used because of the requisite additional metering and storage.

The object is, therefore, to find antifoams for solid formulations, which antifoams are simple to handle and do not lose their activity in the course of the formulation process and the activity of which is retained during storage of the preparations for 2 to 4 years.

A multiplicity of antifoams are known and are reported, for example, in "Ullmanns Enzyklopädie der technischen Chemie" ("Ullmanns Encyclopedia of Industrial Chemistry"), 4th edition, volume 20, pages 411–414 and by W. Schönfeldt in "Grenzflächenaktive Alkylenoxid-Addukte" ("Surface-active alkylene oxide adducts"), Wissenschaftliche Verlagsgesellschaft MBM, Stuttgart 1973, pages 805–853.

However, the substances mentioned in these publications are not always suitable for the preparation of solid formulations because they cannot be used in the preparation of wettable powders by grinding because of their liquid or pasty nature or their low melting point, or because they lose their activity during the formulation process. Thus, for example, highly active silicone antifoam emulsions partly lose their antifoam properties if they are exposed to high shear forces such as occur, for example, in the preparation of water-dispersible granules by spray drying or fluidized bed granulation of aqueous suspensions. If the highly effective silicone antifoams based on powders are used, they must be added to the solid formulations by mixing after the latter have been produced. The process requires the use of suitable mixing equipment and an additional operation. Built-up granules sensitive to abrasion can be damaged by the mixing operation.

Other solid antifoams, such as, for example, aluminum stearate, are not sufficiently effective, especially when large amounts of wetting agent are used in the formulation.

The use of antifoams from the group of chemicals comprising the perfluoro($C_6$–$C_{18}$)alkylphosphinic acids and/or perfluoro($C_6$–$C_{18}$)alkylphosphonic acids and/or their salts in liquid, surfactant-containing systems has also been disclosed (DE-A-22 33 941 and DE-A-21 336). The incorporation of the antifoams in the liquid systems is as a rule effected by addition with slow stirring.

Surprisingly, it has now been found that these substances do not lose their antifoam action even under severe mechanical stress—such as occurs, for example, when grinding wettable powder formulations in hammer mills or when wet-grinding active substances in bead mills to give aqueous suspensions and during the subsequent granulation thereof by spray drying by means of a single substance nozzle or in a fluidized bed.

The invention therefor relates to solid formulations of active substances, which are used in crop protection, and which contain surface-active substances (wetting agents), in combination with a surfactant (antifoam) from the group of chemicals comprising the perfluoroalkylphosphinic acids and/or perfluoroalkylphosphonic acids and/or their salts.

The proportion of antifoam in the formulation can be up to 10% by weight, but in general 0.1 to 5% by weight, preferably 0.1 to 5% by weight and in particular 0.2 to 2% by weight are used.

The formulation also contains 2 to 60% by weight, preferably 5 to 50% by weight, of one or more wetting agents, preferably from the group comprising the alkanesulfonates, alkylnaphthalenesulfonates, alkylbenzenesulfonates, alkylpolyglycol ether-sulfonates, alkylsulfosuccinic acid half-esters, fatty acid N-methyltaurides or mixtures of the above wetting agents.

The active substances, which can be supplied in the form of solid formulations, include all suitable biologically active organic compounds, preferably herbicides and safeners, insecticides, fungicides, acaricides, nematicides, pheromones and repellents, in particular herbicidal active substances, such as glufosinate-ammonium, glyphosate, bialaphos, active substances from the phenoxy series, such as CMPP, MCPA, 2,4-D, active substances from the phenoxyphenoxy series, such as diclofopmethyl, or the heteroaryloxyphenoxy series, such as fenoxaprop-ethyl, fenoxaprop-P-ethyl, active substances from the urea series, such as isoproturon, diuron, linuron, monolinuron and chlortoluron, active substances from the series comprising the sulfonylureas, such as amidosulfuron, tribenuron (DPX-L5300), thiameturon-methyl (DPX-M6316), metsulfuron-methyl (DPX-T6376), primisulfuron-methyl and nicosulfuron, active substances from the series comprising the triazines, such as atrazine or simazine, active substances from the series comprising the imidazolinones, such as imazapyr, imazaquin, imazethapyr and imazamethabenz, and diphenyl ether derivatives, for example acifluorfen, fluoroglycofen, lactofen and bifenox, dicotylene herbicides, for example ioxynil, bromoxynil, dicamba, diflufenican, fluroxypyr, phenmedipham, desmedipham, bentazone, metamitron, metribuzin, chloridazon, ethofumesate or the active substance trifluralin, and safenets, such as, for example, the compounds described in EP-A-86750, EP-A-94349, EP-A-191736, EP-A-346620, EP-A-333131, EP-A-269806, EP-A-159290, DE-A-2546845, PCT/EP-90/02020 and PCT/EP-90/01966; fungicidal active substances, such as, for example, active substances from the series comprising the azoles, for example triadimefon, cyproconazole, myclobutanil and dichlobutrazol, active substances from the series comprising the dithiocarbamates, such as maneb, zineb and mancozeb, the benzimidazoles, for example carbendazime, or active substances such as, for example, procymidone, iprodione, vinchlozoline, thiophanate-methyl, cymoxanil, folpet, copper oxychloride, sulfur or TPTH; insecticidal active substances, such as, for example, active substances from the series comprising the pyrethroids, such as deltamethrin, acrinathrin, tralomethrin, permethrin and cypermethrin, active substances from the benzoylurea series, such as diflubenzuron, or active substances such as, for example, endosulfan, pirimicarb or silafluofen.

The said active substances can also be supplied in combination with one another in the form of solid formulations. The active substance content is as a rule 1 to 80% by weight, preferably 5 to 60% by weight.

Suitable perfluoroalkyl group-containing surfactants are, in particular, perfluoro($C_6$–$C_{12}$)alkylphosphinic acids and perfluoro($C_6$–$C_{12}$)alkylphosphonic acids and their alkali metal salts, such as sodium or potassium salts, their ammonium salts, ($C_2$–$C_{18}$)-alkylammonium salts and also salts with ($C_{10}$–$C_{18}$)-alkylamineethoxylates and ethylenediamineethoxylates or mixtures thereof. The perfluoroalkyl group-containing surfactants are commercially available, for example. ®Fluowet PP (mixture of ($C_6$–$C_{12}$)-perfluoroalkylphosphinic acids and ($C_6$–$C_{12}$)-perfluoroalkylphosphonic acids, Hoechst) or can be prepared by known methods (DE-A 21 11 167).

In addition to the said active substances, the effective antifoams found and wetting agents, the solid formulations can also contain further conventional formulating auxiliaries, such as, for example, dispersants, agglomeration auxiliaries, stabilizers, inert fillers and water-soluble substances, for example ammonium sulfate, urea or sodium sulfate, the content of these substances as a rule being 0 to 70% by weight, preferably 5 to 50% by weight.

The said active substances are also known and are described in "Pesticide Manual" (by the British Crop Protection Council) or in "Farm Chemicals Handbook 91" (Meister Publishing Company, Willoughby, Ohio).

The said perfluoroalkyl group-containing antifoams can also be used in combination with antifoams belonging to other substance categories, in particular in combination with silicone-based antifoams.

By means of the perfluoroalkyl group-containing surfactants used according to the invention it is possible to provide wettable powder formulations and granule formulations, and in particular also water-emulsifiable granules, with antifoams which do not lose their activity either during the preparation or during storage of the products for 2 to 4 years.

In addition to the said active substances, the perfluoroalkoxy group-containing surfactants and wetting agents and also, optionally, further conventional formulating auxiliaries, the said water-emulsifiable granules can contain a high-boiling solvent or solvent mixture. They also contain an at least partially water-soluble casing- and structure-forming material, which preferably essentially comprises at least one substance from the group comprising gelatin, gum arabic, cellulose derivatives, starch derivatives, sodium alginates, polyvinyl alcohols and polyvinylpyrrolidones. Its content is 10 to 80% by weight, preferably 25 to 60% by weight. A casing- and structure-forming material which essentially comprises a polyvinyl alcohol obtained by partial hydrolysis of polyvinyl acetate or a mixture of such polyvinyl alcohols is preferred. Polyvinyl alcohols, or mixtures thereof, with a degree of hydrolysis of preferably 72 to 99 mol % and a viscosity of preferably 2 to 18 cP, determined in a 4% strength aqueous solution at 20° C. (for example ®Mowiol grades), are obtained by hydrolysis, preferably partial hydrolysis, of polyvinyl acetate. The polyvinyl alcohols preferred for the present invention have a molar mass of preferably 10,000 to 20,000. They are prepared by partial, preferably 72 to 99 mol %, alkaline hydrolysis of corresponding polyvinyl acetates.

When the said water-soluble materials are used, in particular when specific polyvinyl alcohol grades or mixtures thereof are used, water-emulsifiable granules which have an average particle diameter of 0.3 to 5 mm, preferably 0.5 to 2 mm, and which do not produce dust, are free-flowing, can readily be metered volumetrically and are readily emulsifiable in water are formed, for example by the fluidized bed process using the countercurrent principle.

Suitable high-boiling organic solvents are mainly high-boiling aromatic compounds, such as, for example, 1- or 2-methylnaphthalene, dimethylnaphthalenes and other polynuclear aromatic compounds. However, other water-immiscible solvents are also suitable, for example aromatic compounds, such as alkylbenzenes and xylenes, aliphatic compounds, such as paraffin oils, vegetable oils, alicyclic compounds, alkanols, such as cyclohexanol and isooctyl alcohol, ethers, ketones, such as cyclohexanone, 4-methylcyclohexanone and isophorone, and esters, such as ethyl benzoate and tri-n-butyl phosphate. Liquid pesticide active substances can also be used without organic solvents. The high-boiling solvent or solvent mixture content is 0 to 80%, preferably 20 to 60%.

The antifoams are also effective if they are added to the aqueous spray slurries of the formulations before these are applied.

The invention therefore also relates to the dilute formulations (spray slurries) which contain the constituents of the solid formulations described in approximately 50- to 500-fold dilution.

The following examples illustrate the invention without restricting the invention thereto. The percentages are by weight.

EXAMPLE 1

| Glufosinate-ammonium 20 WG | |
|---|---|
| 20% | glufosinate-ammonium |
| 40% | ® Hostapur OS |
| 39% | ammonium sulfate |
| 1% | ® Fluowet PP |

The granules are prepared in accordance with DE-A-39 26 800 by spraying an aqueous solution of glufosinate-ammonium onto the pulverulent mixture of the remaining constituents of the formulation in a fluidized bed.

EXAMPLE 2

| Glufosinate-ammonium + diuron (12 + 18) WG | |
|---|---|
| 12.0% | glufosinate-ammonium |
| 18.2% | diuron, 99% strength |
| 16.0% | ® Hostapur OS |
| 12.0% | ® Genapol LRO |
| 5.0% | ® Vanisperse CB |

-continued

| Glufosinate-ammonium + diuron (12 + 18) WG | |
|---|---|
| 1.8% | ® Fluowet PP |
| 35.0% | kaolin |

The granules are prepared in accordance with DE-A-39 26 800 from an aqueous suspension having a solids content of 40% by granulation in a fluidized bed. The suspension is prepared by grinding all of the formulation constituents extremely finely in water with the aid of a bead mill.

EXAMPLE 3

| Isoproturon + amidosulfuron (60 + 1.5) WP | |
|---|---|
| 60.61% | IPU, technical grade, 99% strength |
| 1.56% | amidosulfuron, technical grade, 96% strength |
| 10.00% | ® Geropon SC 213 |
| 6.00% | ® Texapon K12 |
| 21.00% | kaolin 1777 |
| 0.83% | ® Fluowet PP |

The wettable powder is prepared by grinding all of the formulation constituents in a hammer mill.

EXAMPLE 4

| Isoproturon + amidosulfuron (75 + 1.5) WG | |
|---|---|
| 75.76% | IPU, technical grade, 99% strength |
| 1.56% | amidosulfuron, technical grade, 96% strength |
| 10.00% | ® Geropon SC213 |
| 6.00% | ® Texapon K12 |
| 0.30% | ® Forlanit P |
| 5.20% | kaolin 1777 |
| 0.50% | silicone antifoam SE2 |
| 0.68% | ® Fluowet PP-potassium |

The granules are prepared by spraying an aqueous suspension having a solids content of 50% by means of a single substance nozzle and drying in a conventional spraying tower using the co-current principle. The aqueous suspension is prepared by grinding all of the formulation constituents in a bead mill.

EXAMPLE 5

| Amidosulfuron + bromoxynil + diflufenican (2.2 + 37.5 + 7.5) WG | |
|---|---|
| 40.32% | bromoxynil, technical grade, 93% strength |
| 2.37% | amidosulfuron, technical grade, 93% strength |
| 7.73% | diflufenican, technical grade, 97% strength |
| 8.00% | ® Geropon SC 213 |
| 4.00% | ® Texapon K 12 |
| 2.00% | ® Luviskol K 30 |
| 34.58% | kaolin 1777 |
| 0.50% | silicone antifoam SE 2 |
| 0.25% | antifoam 416 |
| 0.25% | ® Fluowet PP |

The granules are prepared from an aqueous suspension having a solids content of 50% in a fluidized bed. For preparation of the aqueous suspension, the formulation constituents with the exception of antifoam 416 are ground in a bead mill and antifoam 416 is then added with slow stirring.

EXAMPLE 6

| Amidosulfuron 50 WP | |
|---|---|
| 52.08% | amidosulfuron, technical grade, 96% strength |
| 10.00% | ® Tamol NNO |
| 6.00% | ® Texapon K 12 |
| 20.00% | kaolin 1777 |
| 11.40% | ® Wessalon S |
| 0.52% | ® Fluowet PP |

The wettable powder is prepared by grinding all of the formulation constituents in a hammer mill.

EXAMPLE 7

| Carbendazim 80 WG | |
|---|---|
| 80.88% | carbendazim, technical grade, 99% strength |
| 5.62% | ® Tamol NNO |
| 2.90% | ® Mowiol 3/83 |
| 5.60% | starch |
| 0.2% | ® Bronidox L |
| 0.2% | silicone antifoam SE 2 |
| 3.60% | ® Forlanit P |
| 1.0% | ® Fluowet PP |

The granules are prepared by spray drying an aqueous suspension having a solids content of 55% in a conventional spray drier and the aqueous suspension is prepared by grinding all of the formulation constituents in a bead mill.

EXAMPLE 8

| Fenoxaprop-p-ethyl + fenchlorazole-ethyl (12 + 6) WEG | |
|---|---|
| 12.50%$ | fenoxaprop-P-ethyl, technical grade, 96% strength |
| 6.15% | fenchlorazole-ethyl, technical grade, 97.6% strength |
| 43.50% | ® Solvesso 200 (Exxon Chemical) |
| 20.00% | ® Mowiol 3/83 |
| 11.35% | ® Mowiol 4/88 |
| 5.00% | ® Hostapur OSB |
| 0.50% | ® Fluowet PP |
| 1.00% | residual moisture |

101 g of a polyvinyl alcohol prepared by partial saponification of polyvinyl acetate and having a viscosity of 3 cP (determined in 4% strength aqueous solution at 20° C.) and a degree of hydrolysis of 83 mol % are dissolved in 600 g of water and 57.3 g of a polyvinyl alcohol prepared in the same way and having a viscosity of 4 cP and a degree of hydrolysis of 88 mol % are added slowly, with vigorous stirring. The aqueous phase is then homogenized. A solution of 63 g of fenoxaprop-P-ethyl and 31 g of fenchlorazole-ethyl in 220 g of ®Solvesso 200 is then allowed to run into the aqueous phase while continuing to stir and the speed of rotation of the stirrer is then increased so that the oily droplets formed in the aqueous phase have an average diameter of 5 to 10 μm.

The resulting suspension is then metered into a laboratory fluidized bed drier. The water-dispersible granules thus obtained have a particle diameter of 0.5 to 2 mm. A stable suspoemulsion forms in water.

The surfactants and auxiliaries listed in Examples 1 to 8 are known and can be obtained from

| | |
|---|---|
| Hoescht AG | (® Hostapur OS, ® Genapol LRO, ® Mowiol) |
| Henkel KG | (® Texapon K12, ® Forlanit P, ® Bromidox L) |
| BASF | (® Tamal NNO, ® Luvispol K 30) |
| Wacker Chemie GmbH | (Silicone antifoam SE 2) |
| Rhone-Poulenc | (® Geropon SC 213, Antifoam 416) |
| Borregaard A.S. | (® Vanisperse CB) |
| Exxon Chemical | (® Solvesso) |

Foam test

A 1 l measuring cylinder (diameter: 5 cm) closeable with a glass stopper is filled with 500 ml of standard water D (342 ppm $CaCO_3$ hardness according to CIPAC Handbook 1, p. 878). After adding 5 g of product, the closed cylinder is turned 10 times through 180° and back again. Immediately thereafter the time taken for the foam formed to collapse is measured.

Result:

When formulations which contain the antifoams according to the invention are used, 90% of the foam disappears within 2 to 3 min and frequently the entire foam also collapses within 1 min.

When formulations are used which are prepared by the processes indicated in the examples and which do not contain the antifoams according to the invention or silicone-based antifoams, the foam frequently remains stable for more than 30 min.

I claim:

1. A solid formulation which contains wetting agents, having tendency to foam when dispersed in water, in combination with a surfactant (antifoam) selected from the group consisting of perfluoro-($C_5$–$C_{18}$)-alkylphosphinic acids and their salts, perfluoro-($C_5$–$C_{18}$)-alkylphosphonic acids and their salts and mixtures thereof, wherein the antifoam content is 0.1 to 10% by weight based on the solid formulation, and which solid formulation is prepared from a mixture of formulation constituents under exposure of high shear forces such as that which occurs during grinding methods or spray drying granulation methods, in the presence of the antifoam.

2. The solid formulation as claimed in claim 1, which is a solid formulation to be used in crop protection and which contains at least one active substance selected from the group consisting of herbicides, safeners, fungicides and insecticides.

3. The formulation as claimed in claim 1, which contains, as surfactant, perfluoro-($C_6$–$C_{18}$)-alkylphosphinic acids or perfluoro-($C_6$–$C_{18}$)-alkylphosphonic acids or their alkali metal, ammonium or $C_2$–$C_{18}$-alkylammonium salts or their salts with $C_{10}$–$C_{18}$-alkylaminethoxylates or ethylenediamine-ethoxylates or mixtures of the above surfactants.

4. The formulation as claimed in claim 1, which contains, in addition to the said constituents, further conventional formulating auxiliaries selected from the group consisting of dispersants, agglomeration auxiliaries, stabilizers and fillers.

5. The formulation as claimed in claim 1, which is granules.

6. The formulation as claimed in claim 5, which is water-emulsifiable granules.

7. A method for preparing dilute formulations (spray slurries) which have low tendency to foam, wherein a solid formulation as claimed in claim 1 is used as concentrated formulation to be diluted.

8. A formulation as claimed in claim 1 which contains 2 to 60% by weight of the wetting agent.

9. A formulation as claimed in claim 1, which contains a wetting agent selected from the group consisting of alkanesulfonates, alkylnaphthalensulfonates, alkylbenzenesulfonates, alkylpolyglycol ether-sulfonates, alkylsulfosuccinic acid half-esters, fatty acid N-methyltaurides and mixtures thereof.

10. A formulation as claimed in claim 1 which contains 2 to 60% by weight of wetting agents, 0.1 to 10% by weight of a surfactant (antifoam) selected from the group consisting of perfluoro-($C_6$–$C_{18}$)-alkylphosphinicacids, perfluoro-($C_6$–$C_{18}$)-alkylphosphonic acids and their salts, 0 to 80% by weight of a biologically active organic compound used in agriculture, and 0 to 70% by weight of formulation auxiliaries which are conventional in agricultural formulations.

11. A formulation as claimed in claim 10, containing 5 to 50% by weight of wetting agents and 0.1 to 5% by weight of a surfactant (antifoam) selected from the group consisting of perfluoro-($C_6$–$C_{18}$)-alkylphosphinic acids, perfluoro-($C_6$–$C_{18}$)-alkylphosphonic acids and their salts.

12. A formulation as claimed in claim 11 which contains a wetting agent selected from the group consisting of alkanesulfonates, alkylnaphthalensulfonates, alkylbenzenesulfonates, alkylpolyglycol ether-sulfonates, alkylsulfosuccinic acid half-esters, fatty acid N-methyltaurides and mixtures thereof.

13. A formulation as claimed in claim 10, which is a solid formulation for use in crop protection and which contains 1 to 80% by weight of at least one active substance selected from the group consisting of herbicides, safeners, fungicides and insecticides.

14. A formulation as claimed in claim 13 which contains a wetting agent selected from the group consisting of alkanesulfonates, alkylnaphthalensulfonates, alkylbenzenesulfonates, alkylpolyglycol ether-sulfonates, alkylsulfosuccinic acid half-esters, fatty acid N-methyltaurides and mixtures thereof.

15. A formulation as claimed in claim 10 which contains a wetting agent selected from the group consisting of alkanesulfonates, alkylnaphthalensulfonates, alkylbenzenesulfonates, alkylpolyglycol ether-sulfonates, alkylsulfosuccinic acid half-esters, fatty acid N-methyltaurides and mixtures thereof.

16. The solid formulation as claimed in claim 1, wherein the antifoam content is 0.1 to 5% by weight.

17. A solid formulation which contains wetting agents, having tendency to foam when dispersed in water, in combination with a surfactant (antifoam) selected from the group consisting of perfluoro-($C_5$–$C_{18}$)-alkylphosphinic acids and their salts, perfluoro-($C_5$–$C_{18}$)-alkylphosphonic acids and their salts and mixtures thereof, wherein the antifoam content is 0.1 to 10% by weight based on the solid formulation, and the solid formulation is a wettable powder.

18. A process for the preparation of a solid formulation which contains wetting agents, having tendency to foam when dispersed in water, in combination with a surfactant (antifoam) selected from the group consisting of perfluoro-($C_5$–$C_{18}$)-alkylphosphinic acids and their salts, perfluoro-($C_5$–$C_{18}$)-alkylphosphonic acids and their salts and mixtures thereof, wherein the antifoam content is 0.1 to 10% by weight based on the solid formulation, wherein active substances are ground together with further components, optionally in the presence of water and, optionally, dried, if water is present, or an aqueous suspension is prepared therefrom, which is subsequently granulated.

* * * * *